US007133983B2

(12) United States Patent
Bartfai et al.

(10) Patent No.: US 7,133,983 B2
(45) Date of Patent: Nov. 7, 2006

(54) METHOD, SYSTEM, AND PROGRAM FOR ASYNCHRONOUS COPY

(75) Inventors: Robert Francis Bartfai, Tucson, AZ (US); William Frank Micka, Tucson, AZ (US); Thomas Charles Jarvis, Tucson, AZ (US); Olympia Gluck, Haifa (IL); Michael E. Factor, Haifa (IL); Irit Dolev, Haifa (IL); Warren K. Stanley, Tucson, AZ (US); Martin Jacob Tross, Haifa (IL); Sam Clark Werner, Tucson, AZ (US); Aviad Zlotnick, Mitzpeh Netofah (IL); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 10/675,317

(22) Filed: Sep. 29, 2003

(65) Prior Publication Data

US 2005/0071586 A1    Mar. 31, 2005

(51) Int. Cl.
G06F 12/16 (2006.01)
(52) U.S. Cl. .............................. 711/161; 714/6; 714/5; 711/162
(58) Field of Classification Search ................ 711/162, 711/112
See application file for complete search history.

(56) References Cited

U.S. PATENT DOCUMENTS

| 4,686,620 | A | 8/1987 | Ng |
| 5,504,861 | A | 4/1996 | Crockett et al. |
| 5,615,329 | A | 3/1997 | Kern et al. |
| 5,692,155 | A | 11/1997 | Iskiyan et al. |
| 6,304,980 | B1 * | 10/2001 | Beardsley et al. ............. 714/6 |
| 6,434,681 | B1 | 8/2002 | Armangau |
| 6,446,175 | B1 | 9/2002 | West et al. |
| 6,484,186 | B1 | 11/2002 | Rungta |
| 6,578,120 | B1 | 6/2003 | Stanley et al. |
| 6,591,351 | B1 | 7/2003 | Urabe et al. |
| 2002/0083037 | A1 | 6/2002 | Lewis et al. |
| 2002/0133512 | A1 | 9/2002 | Milillo et al. |
| 2004/0034808 | A1 * | 2/2004 | Day et al. ....................... 714/6 |
| 2004/0250029 | A1 * | 12/2004 | Ji et al. ....................... 711/162 |
| 2004/0250030 | A1 * | 12/2004 | Ji et al. ....................... 711/162 |
| 2004/0260902 | A1 * | 12/2004 | Stanley et al. ............. 711/165 |
| 2005/0193179 | A1 * | 9/2005 | Cochran et al. ............ 711/162 |

OTHER PUBLICATIONS

Symmetrix Remote Data Facility, Product Description Guide; Jun. 2000; EMC; Whole Document.*
Jim Handy; The Cache Memory Book; 1998; Academic Press; 2nd Edition.*
U.S. Patent Application entitled "Method, System, and Program for Converting an Input Parameter List into an Output Parameter List", U.S. Appl. No. 09/347,344, filed Jul. 2, 1999 by inventors David Charles Reed and John Glenn Thompson.

(Continued)

Primary Examiner—B. James Peikari
(74) Attorney, Agent, or Firm—Janaki K. Davda; Konrad Raynes & Victor LLP

(57) ABSTRACT

For a technique for maintaining consistency of data, one or more blocks of data identified by a first structure are copied to form a consistent set of data. While not acknowledging completion of write requests to any blocks of data, a second structure is created, wherein the second structure indicates which blocks of data are modified while the consistent set of data is being formed.

30 Claims, 14 Drawing Sheets

OTHER PUBLICATIONS

USENIX Assoc., "Proceedings of the FAST 2002 Conference on File and Storage Technologies", Monterey California, Jan. 2002.

Hitachi Data Systems, "Software Solutions Guide for Enterprise Storage", Chapter 3, pp. 15-31.

A.C. Azagury, et al., "Advanced Functions for Storage Subsystems: Supporting Continuous Availability", IBM Systems Journal, vol. 42, No. 2, 2003, pp. 268-279.

B. Worthington., "Using the IBM Enterprise Storage Server with z/OS and Oracle 9i", zSeries Oracle SIG Conference, Clearwater, Apr. 2003, Charts 1-52.

IBM Corp., "DFSMS/MVS Version 1 Remote Copy Administrator's Guide and Reference", Doc. No. SC35-0169-02, Topic 1, pp. 1.0-1-1.3.2.2-1.

U.S. Patent Application entitled "Method, System, and Article of Manufacture for Remote Copying of Data", U.S. Appl. No. 10/464,024, filed Jun. 17, 2003, by inventors W.K. Stanley, et al.

* cited by examiner

FIG. 2

Nonvolatile Cache 118

Out of Sync Structure 210

Change Recording Structure 220

State 230

METHOD, SYSTEM, AND PROGRAM FOR ASYNCHRONOUS COPY

BACKGROUND OF THE INVENTION

1. Field of the Invention

The present invention is directed to asynchronous copy in remote mirroring systems, such as peer to peer remote copy.

2. Description of the Related Art

Computing systems often include one or more host computers ("hosts") for processing data and running application programs, direct access storage devices (DASDs) for storing data, and a storage controller for controlling the transfer of data between the host computers and the DASD. Storage controllers, also referred to as control units or storage directors, manage access to a storage space comprised of numerous hard disk drives, otherwise referred to as a Direct Access Storage Device (DASD). Host computers may communicate Input/Output (I/O) requests to the storage space through the storage controller.

Some disaster recovery systems address data loss over a period of time, in which case writes to volumes on data storage may be lost. The writes may update data, write new data, or write the same data again. To assist in recovery of data writes, a copy of data may be provided at a remote location. Such copies may also be referred to as dual or shadow copies. International Business Machines Corporation (IBM), the assignee of the subject patent application, provides a remote mirroring system, including a PPRC Extended Distance service in an Enterprise Storage Server® (ESS) system. The PPRC Extended Distance service is described in IBM publication "Remote Copy: Administrator's Guide and Reference," IBM document no. SC35-0169-02 (IBM Copyright 1994, 1996), which publication is incorporated herein by reference in its entirety.

The PPRC Extended Distance service provides a technique for mirroring data in order to facilitate recovery after a system failure. Such data shadowing systems can also provide an additional remote copy for non-recovery purposes, such as local access at a remote site.

With the PPRC Extended Distance service, a primary storage subsystem maintains a copy of predefined datasets on a secondary storage subsystem. The copy may be used for disaster recovery. In particular, when an application program at a host computer submits writes for a volume at the primary storage subsystem, the PPRC Extended Distance service asynchronously transfers the writes to a secondary storage subsystem. The secondary storage subsystem updates the data in a corresponding volume.

PPRC Extended Distance service does not write to secondary storage subsystem before acknowledging the write to the primary storage subsystem. Instead, for the PPRC Extended Distance service, when a track is written, information is stored that indicates that the track is to be transferred to the secondary storage subsystem at a later time. An asynchronous process collects updates at the primary storage subsystem and sends the updates to the secondary storage subsystem.

In such mirroring systems, data is maintained in volume pairs. A volume pair is comprised of a volume in a primary storage device and a corresponding volume in a secondary storage device that includes a copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistency transaction set is a collection of updates to the primary volumes such that dependent writes are secured in a consistent manner. Consistency groups maintain data consistency across volumes.

A consistency time is a time the system derives from the application system's time stamp to the data set. A consistency group has a consistency time for all data writes in a consistency group having a time stamp equal or earlier than the consistency time stamp. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

To form consistency groups among pairs of volumes participating in an asynchronous PPRC Extended Distance service, host computer Input/Output (I/O) to the primary volume is stopped in order to create a set of consistent updates. This usually requires host I/O to be quiesced, while a consistent set of updates forms on the secondary volume. Whenever host I/O is quiesced, there are detrimental effects for application program performance and availability on the host computer.

Thus, there is a need in the art for allowing the host computer application program to continue processing with minimal impact, while a consistent set of updates forms on the secondary volume.

SUMMARY OF THE INVENTION

Provided are a method, system, and program for maintaining consistency of data. One or more blocks of data identified by a first structure are copied to form a consistent set of data. While not acknowledging completion of write requests to any blocks of data, a second structure is created, wherein the second structure indicates which blocks of data are modified while the consistent set of data is being formed.

Also provided are a method, system, and program for asynchronous copy. Indicators are updated in a first structure for one or more blocks of data, wherein each indicator in the first structure indicates whether a corresponding block of data was modified since the block of data was last sent to remote storage. While copying the blocks of data identified by the indicators in the first structure as having been modified since the blocks of data were last sent to remote storage, indicators in a second structure are updated for the one or more blocks of data, wherein each indicator in the second structure indicates whether a corresponding block of data was modified while a consistent set of data is being formed.

BRIEF DESCRIPTION OF THE DRAWINGS

Referring now to the drawings in which like reference numbers represent corresponding parts throughout:

FIG. 2 illustrates, in a block diagram, further details of a non-volatile cache in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
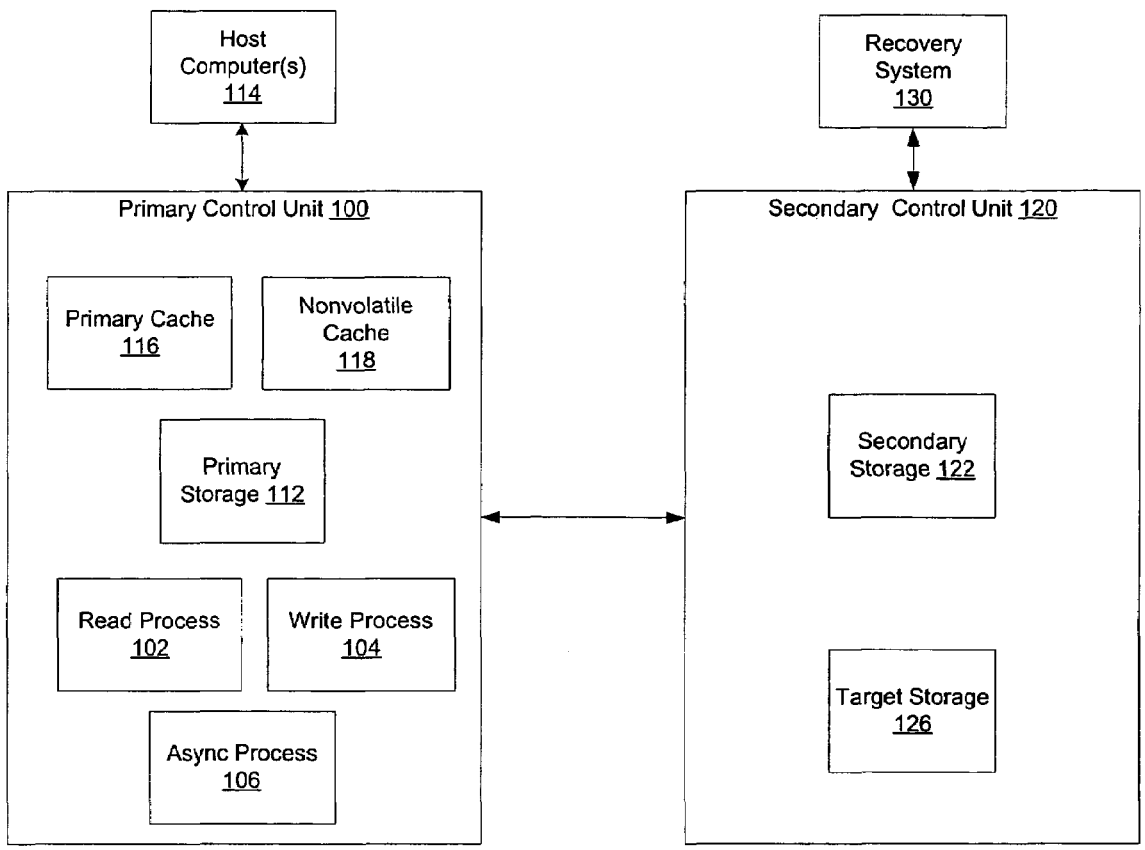
FIGS. 1A and 1B illustrate, in block diagrams, a computing environment in accordance with certain implementations of the invention.
Figure 1B:
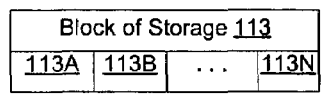

FIGS. 1A and 1B illustrate, in block diagrams, a computing environment in accordance with certain implementations of the invention. A primary control unit 100 provides one or more host computers 114 access to primary storage 112, such as Direct Access Storage Device (DASD). The primary storage 112 may be divided into blocks of storage 113 containing blocks of data, and the blocks of storage 113 are further divided into sub-blocks of storage (113A–113N, where N may be any number) that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The primary control unit 100 includes a primary cache 116 in which updates to tracks in the primary storage 112 are maintained until written to primary storage 112 (i.e., the tracks are destaged). Additionally, the primary control unit 100 includes a nonvolatile cache 118. The non-volatile cache 118 may be, for example, a battery-backed up volatile memory, to maintain a non-volatile copy of data updates and other information.

The primary control unit 100 includes a read process 102 for reading data, and a write process 104 for writing data. The primary control unit 100 also includes an async process 106 for transferring data from the primary control unit 100 to remote storage, such as storage at the secondary control unit 120. In certain implementations, the async process 106 may perform synchronization of data for an asynchronous PPRC Extended Distance service. In such cases, the async process 106 runs continuously for the PPRC Extended Distance service. In certain implementations, there may be multiple async processes (e.g., one async process for each volume on primary storage 112 for PPRC Extended Distance). In certain implementations, the read process 102, write process 104, and async process 106 are implemented as firmware.

Secondary control unit 120 provides one or more recovery systems 130 access to disk storage, such as secondary storage 122, which maintains back-up copies of all or a subset of the volumes of the primary storage 112. Secondary storage may be a Direct Access Storage Device (DASD). Secondary storage 122 is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The secondary control unit 120 also includes a target storage 126. The secondary control unit 120 may perform an instant virtual copy operation to copy data from the secondary storage 122 to the target storage 126. Instant virtual copy operations work by modifying metadata, such as relationship tables or pointers, to treat a source data object as both the original and copy. In response to a host's copy request, the storage subsystem immediately reports creation of the copy without having made any physical copy of the data. That is, a "virtual" copy has been created. Additionally, in certain implementations, a physical copy may be made. Later, when the storage system receives updates to the original or copy, the updates are stored separately and cross-referenced to the updated data object only.

One such instant virtual copy operation is known as a FlashCopy® operation. A FlashCopy® operation involves establishing a logical point-in-time relationship between source and target volumes on the same or different devices. The FlashCopy® operation maintains a target track on a source disk until the track in a FlashCopy® relationship has been hardened to its location on the target disk. Further details of FlashCopy® operations are described in the copending and commonly assigned U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

In certain implementations, removable storage (instead of or in addition to remote storage, such as secondary storage 122) may be used to maintain back-up copies of all or a subset of the primary storage 112, and the techniques of the invention transfer data to the removable storage rather than to the remote storage. The removable storage may reside at the primary control unit 100.

In certain implementations, the primary control unit 100 and secondary control unit 120 may be comprised of the IBM 3990, Model 6 Storage Controller, Enterprise Storage Server®, or any other control unit known in the art.

In certain implementations, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, recovery systems, and secondary storage.

In certain implementations of the invention, data is maintained in volume pairs. A volume pair is comprised of a volume in a primary storage device (e.g., primary storage 112) and a corresponding volume in a secondary storage device (e.g., secondary storage 122) that includes a consistent copy of the data maintained in the primary volume. For example, primary storage 112 may include Volume1 and Volume2, and secondary storage 122 may contain corresponding Volume1 and Volume2. A primary storage controller may be provided to control access to the primary storage and a secondary storage controller may be provided to control access to the secondary storage.

In certain implementations, the primary control unit 100 and secondary control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

In certain implementations, the primary storage 112 and secondary storage 122 are physically divided into tracks, which are physically divided into sectors. Although the examples herein refer to dividing storage physically into tracks and sectors, the technique of the invention is applicable to any division of storage.

Using the primary cache 116 of fast memory to store tracks from primary storage 112, the primary control unit 100 is able to operate at speeds that are orders of magnitude higher than the speeds available from accessing the primary storage 112 for the tracks. For a read operation, this is possible because input/output (I/O) operations tend to be clustered around the same locations, and it is possible to anticipate which tracks are best to have in primary cache 116. For a write operation, this is possible due to the capability of the primary cache 116 to buffer write operations, and is especially effective in situations of "burst" writes. A burst write refers to writing of a sequence of data counted as one unit in accordance with some specific criterion or measure. A write operation may update data, write new data, or write the same data again.

Initially, host computer 114 writes data to a track in primary cache 116. Write operations modify the track in primary cache 116 synchronously (i.e., writing host computer 114 waits for the operation to complete), and then, in a background process, primary cache 116 content is written to primary storage 112. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. In most cases, destage occurs prior to demotion. Copying all or a portion of a track from primary storage 112 to primary cache 116 is a staging operation. Creating a track in primary cache 116 is a promotion operation and involves creating a directory entry. A promotion operation can happen without a stage operation. One example would be when a track not previously in primary cache 116 is written to primary cache 116 by a host computer 114. Additionally, data is copied from primary storage 112 to secondary storage 122 asynchronously.

FIG. 2 illustrates, in a block diagram, further details of non-volatile cache 118 in accordance with certain implementations of the invention. Nonvolatile cache 118 includes an out of sync (OOS) structure 210 (e.g., a bitmap), a change recording structure 220, and a state 230 that indicates the state of the system.

The out of sync structure 210 is used to determine which tracks have been modified since the last transfer to the secondary control unit 120, without regard to the particular modified sectors of the track. The out of sync structure 210 includes an out of sync (OOS) indicator (e.g., bit) for each track, which indicates whether any portion of the track has been modified since the last time the track was copied to the secondary control unit 120. This indicator is called the track's Out Of Sync (OOS) indicator, since the indicator indicates that this track is not yet synchronized with the secondary control unit 120 (i.e., the track has been modified since the last time the track was sent to the secondary control unit 120). When an indicator is set to a first value (e.g., one), the setting indicates that the block of data is not yet synchronized with the secondary control unit 120. When an indicator is set to a second value (e.g., zero), the setting indicates that the block of data is synchronized with the secondary control unit 120.

In certain implementations, there is one out of sync structure 210 for each volume on primary storage 112. In certain implementations, the out of sync structure 210 resides in volatile cache, such as primary cache 116, with a copy in primary storage 112, and only changes to the out of sync structure 210 are stored in nonvolatile cache 118. In certain implementations, the async process 106 runs continuously to drain the out of sync structure 210. The term "drain" refers to copying blocks of data that have been identified as changed by the indicators in the out of sync structure 210.

A change recording structure 220 is used to monitor updates to blocks of data within portions of data in the primary storage 112. The change recording structure 220 includes an indicator (e.g., a bit) for each block of data in the primary storage 112 that has been modified while a consistent set of data is being formed on the secondary control unit 120. When an indicator is set to a first value (e.g., one), the setting indicates that the block of data has been updated while the consistent set of data was being formed. When an indicator is set to a second value (e.g., zero), the setting indicates that the block of data has not been updated while the consistent set of data was being formed.

For PPRC Extended Distance, the host computer 114 will complete writing a track to the primary control unit 100 without the track having been sent to the secondary control unit 120. After the track has been written to the primary control unit 100, the async process 106 discovers that the indicator corresponding to the track is set in the out of sync structure 210 and will send the track to the secondary control unit 120. That is, the track is sent asynchronously with respect to the track written by the host.

Figure 3A:
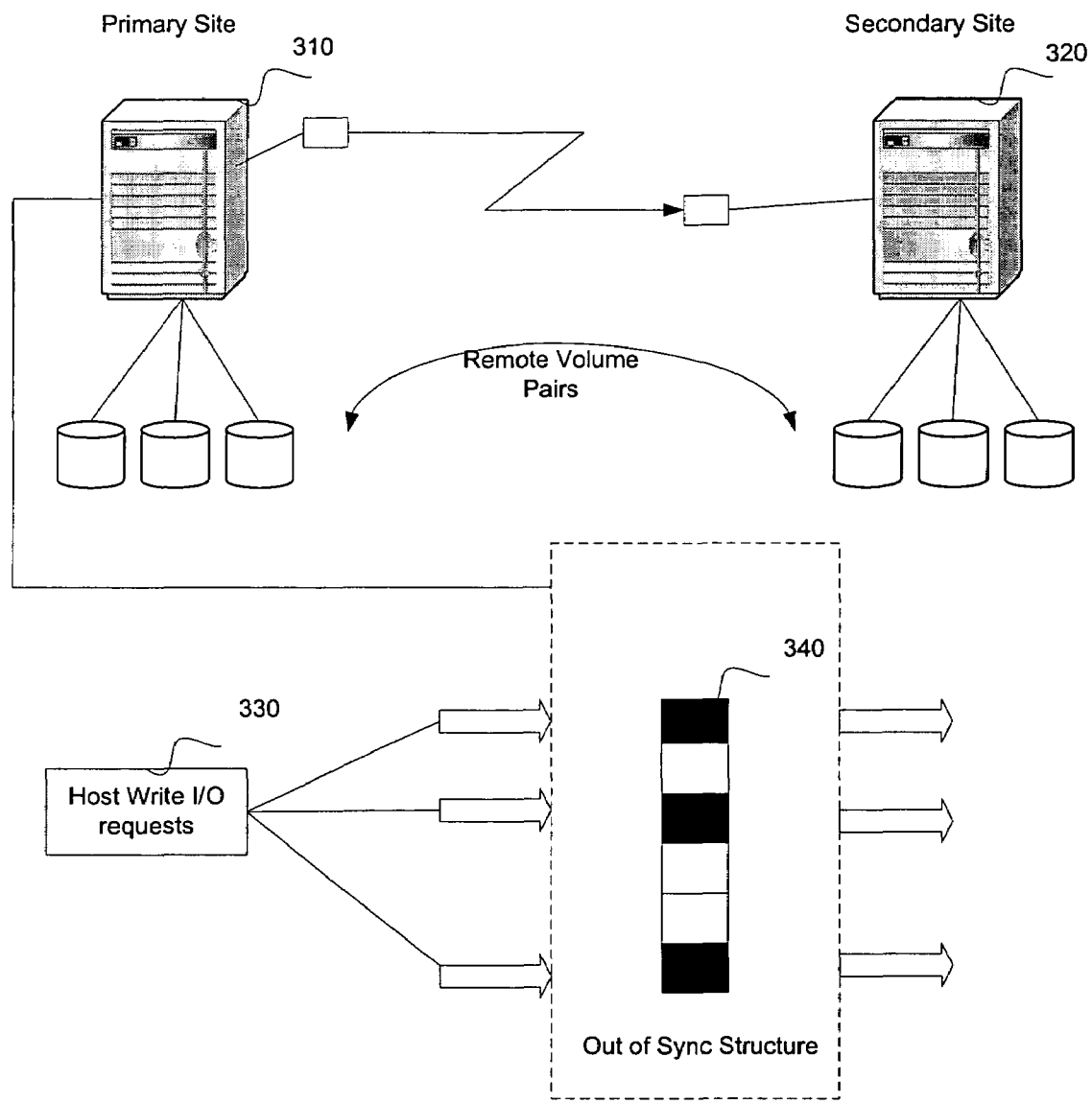
FIG. 3A illustrates a block diagram in which a state is "normal" in accordance with certain implementations of the invention.
Figure 3A:
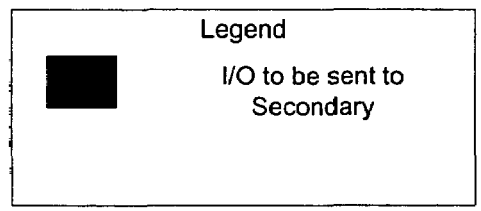

FIG. 3A illustrates a block diagram in which the state 230 is "normal" in accordance with certain implementations of the invention. A primary control unit 310 at the primary site is connected to a secondary control unit 320 at the secondary site. As host write I/O requests 330 (also called "write requests") are received at the primary control unit 310, indicators in an out of sync structure 340 are set to identify blocks of data (e.g., tracks) that have been updated and that are to be copied to the secondary control unit 320 asynchronously.

Figure 3B:
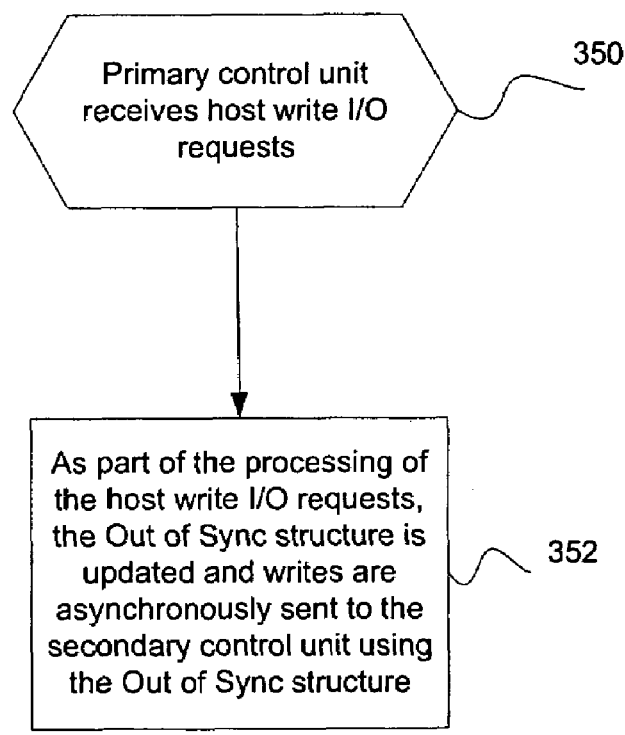
FIG. 3B illustrates logic implemented for normal mode in accordance with certain implementations of the invention.

FIG. 3B illustrates logic implemented for normal mode in accordance with certain implementations of the invention. Control begins at block 350 with the primary control unit 310 receiving host write I/O requests to write data. In block 352, as part of processing the host write I/O requests, the out of sync structure 340 is updated to identify which blocks of data have been written by the host write I/O requests and the writes are asynchronously sent to the secondary control unit 320.

Figure 4A:
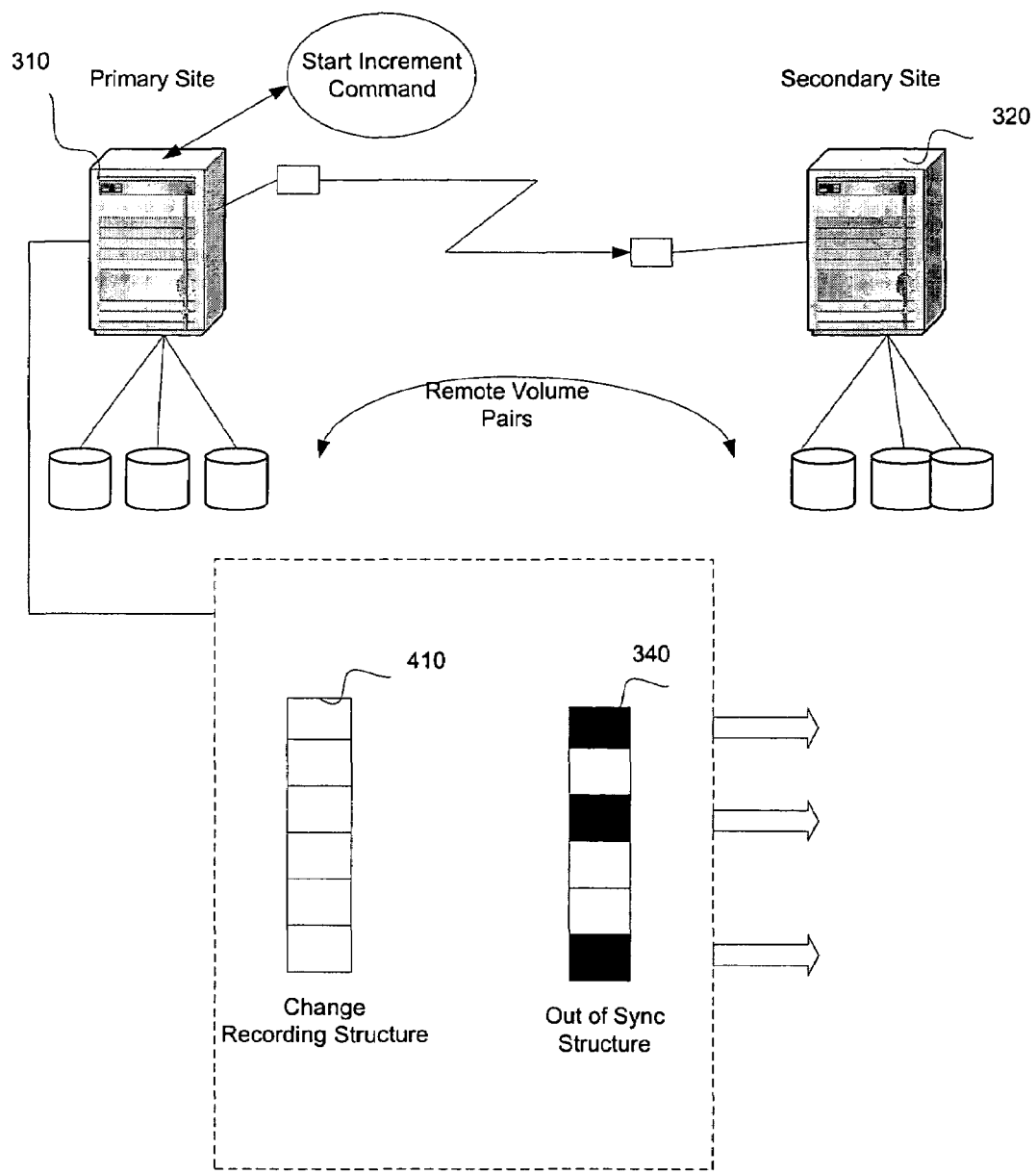
FIG. 4A illustrates a block diagram in which a state is set to "increment pending" in accordance with certain implementations of the invention.
Figure 4A:
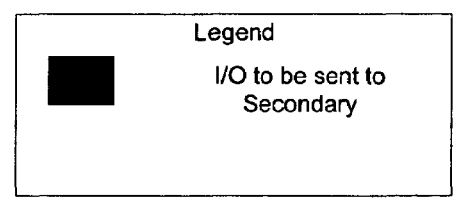
Figure 4B:
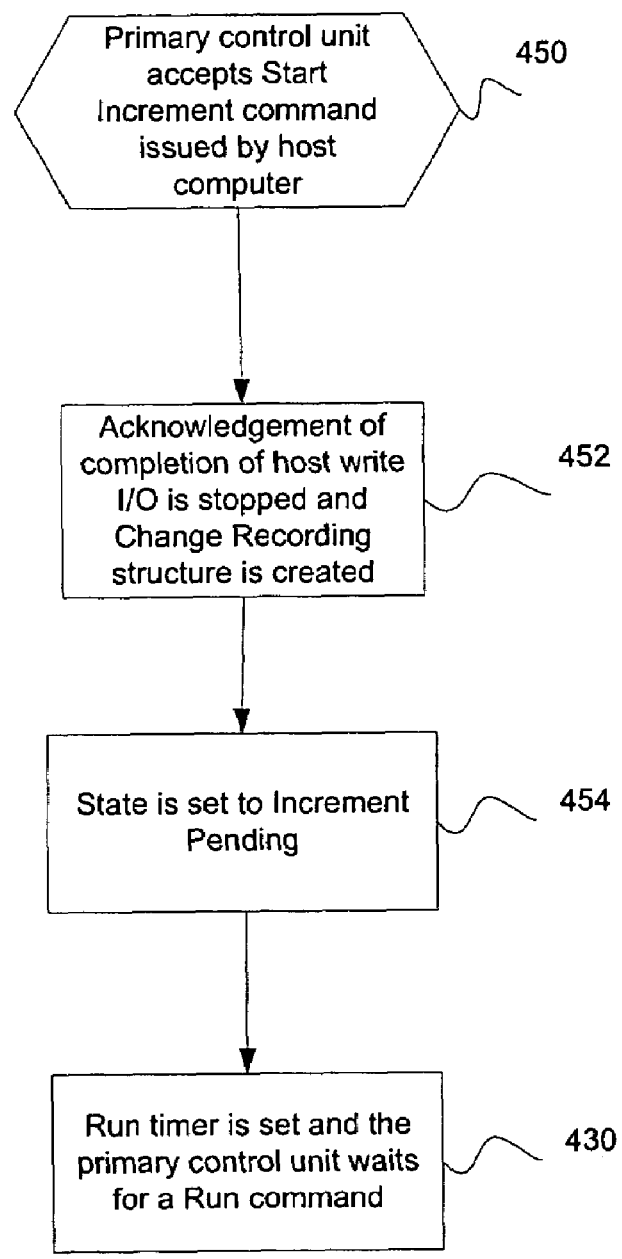
FIG. 4B illustrates logic implemented when a start increment command is accepted in accordance with certain implementations of the invention.

FIG. 4A illustrates a block diagram in which the state 230 is set to "increment pending" in accordance with certain implementations of the invention, and FIG. 4B illustrates logic implemented when a start increment command is accepted in accordance with certain implementations of the invention. FIG. 4A includes the out of sync structure 340, as well as, a change recording structure 410 that has been created. Also, in FIG. 4A, host write I/O requests are not completed while the change recording structure 410 is being created. In certain implementations of the invention, host write I/O requests are not completed by not acknowledging the completion. In various implementations of the invention, the host write I/O requests may be processed to varying stages of processing without having been completed. The start increment command signals that updating of the out of sync structure 310 is to cease and updating of a change recording structure 410 is to start.

In FIG. 4B, control begins at block 450 with the primary control unit 310 accepting a start increment command that is issued by a host computer. Implementations of the invention provide the start increment command to allow a consistent set of data to be formed without quiescing host write I/O requests during the entire copy process. In block 452, acknowledgment of completion of host write I/O is stopped by the write process 104 and a change recording structure 410 is created. In block 454, the state 230 is set to "increment pending". In block 430, a run timer is set, and the primary control unit 310 waits for a run command. If the run command is not received within the timer period of the run timer, error processing may occur.

Figure 5A:
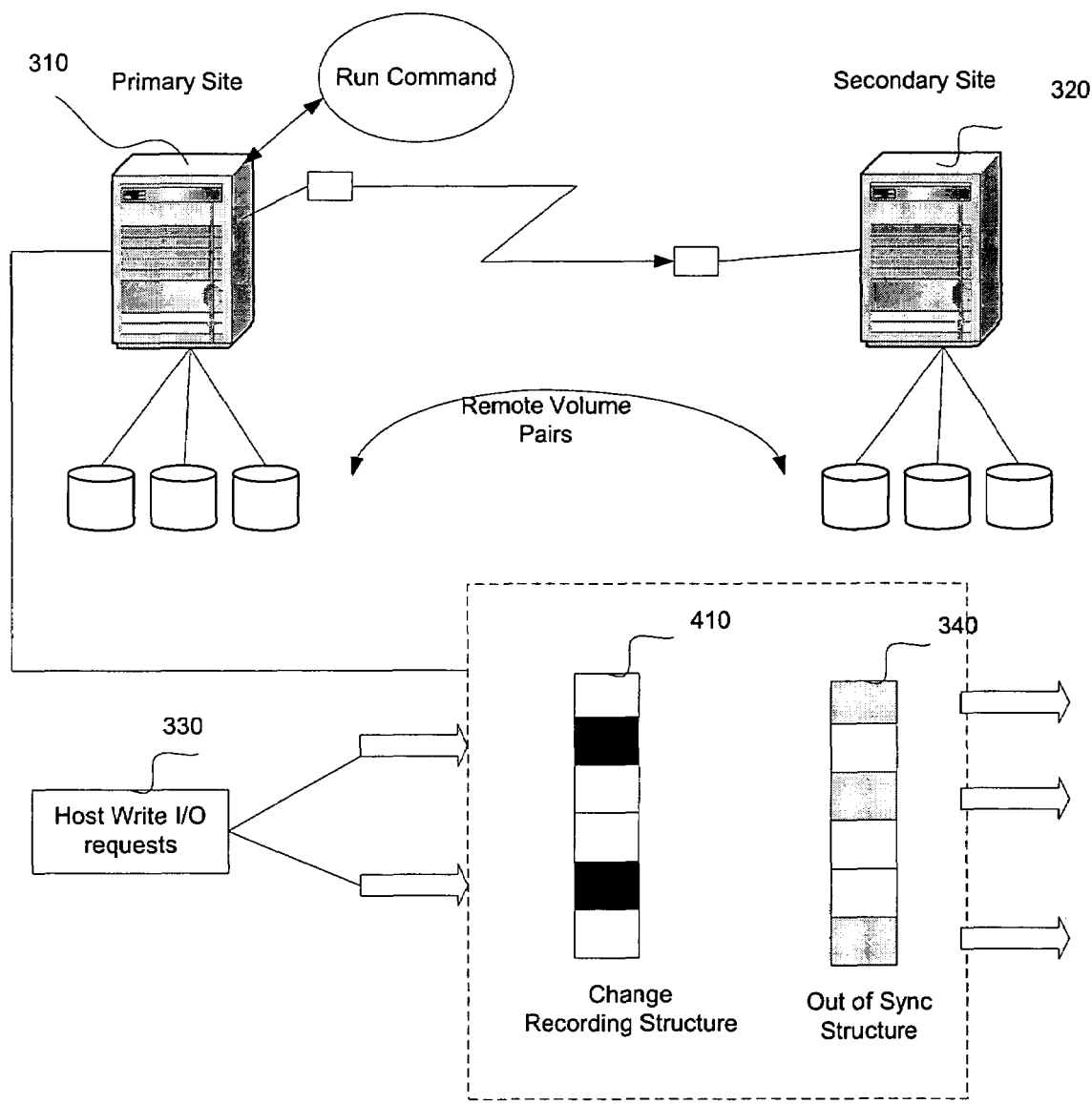
FIG. 5A illustrates a block diagram in which a state is set to "consistency group in progress" in accordance with certain implementations of the invention.
Figure 5B:
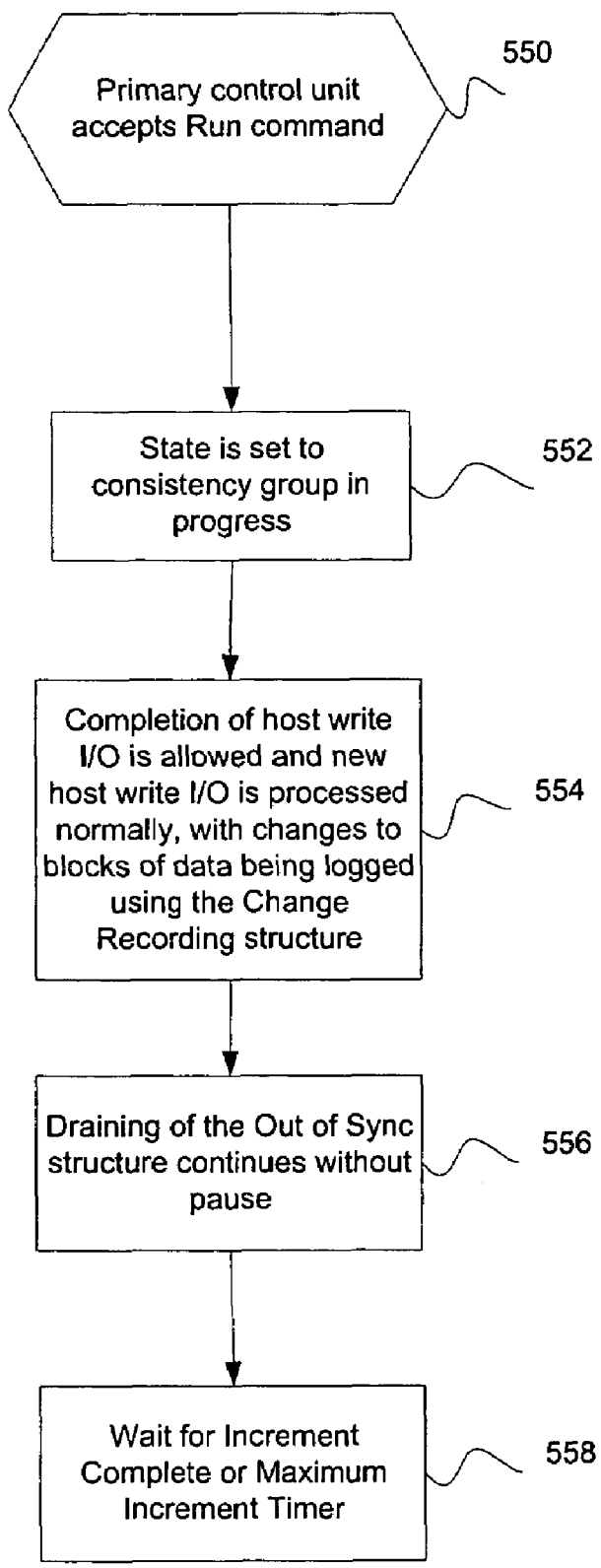
FIG. 5B illustrates logic implemented when a run command is accepted in accordance with certain implementations of the invention.

FIG. 5A illustrates a block diagram in which the state 230 is set to "consistency group in progress" in accordance with certain implementations of the invention, and FIG. 5B illustrates logic implemented when a run command is accepted in accordance with certain implementations of the invention. In FIG. 5A, as host write I/O requests are received at the primary control unit 310, indicators are set in the change recording structure 410 to indicate which blocks of data have been modified while the blocks of data identified by the out of sync structure 340 are being copied to the secondary control unit 320 by the async process 106.

In FIG. 5B, control begins at block 550 with the primary control unit 310 accepting a run command from a host computer. In block 552, the state 230 is set to "consistency group in progress". In block 554, completion of host write I/O is allowed and new host write I/O is processed normally, with changes to blocks of data being logged using the change recording structure 410. Note that acknowledgment of completion of host write I/O was stopped in block 452 so that the change recording structure 410 could be created. In certain implementations, before switching to using the change recording structure 410 instead of the out of sync structure 340, host write I/O requests in progress are completed. In certain alternative implementations, after switching to using the change recording structure 410 instead of the out of sync structure 340, host write I/O requests in progress are completed. In block 556, the draining of the out of sync structure 340 to the secondary control unit 320 continues without pause. Although draining is described in block 556, the async process 106 continually drains the out of sync structure 210 throughout all of the processing discussed with reference to, for example, FIGS. 3B, 4B, 5B, 6, 7A, 7B, and 8B. The term "drained" refers to copying blocks of data that have been identified as changed by the out of sync structure 340. Additionally, when an identified block of data has been copied, the async process 106 sets an indicator corresponding to the block of data in the out of sync structure 340 to a second value to indicate that the block of data is synchronized with the secondary control unit 120. In block 558, the primary control unit 310 waits for an increment complete command or the termination of the time period of a maximum increment timer. The maximum increment timer is a timer period during which an increment complete command should be received. If the timer period is exceeded without receiving the increment complete command, error processing may occur. Upon receiving an increment complete command within the timer period, the primary control unit 310 goes back to normal mode, in which the out of sync structure is used to identify which blocks of data have been written since the last time the block of data was copied to the secondary control unit 320.

Figure 6:
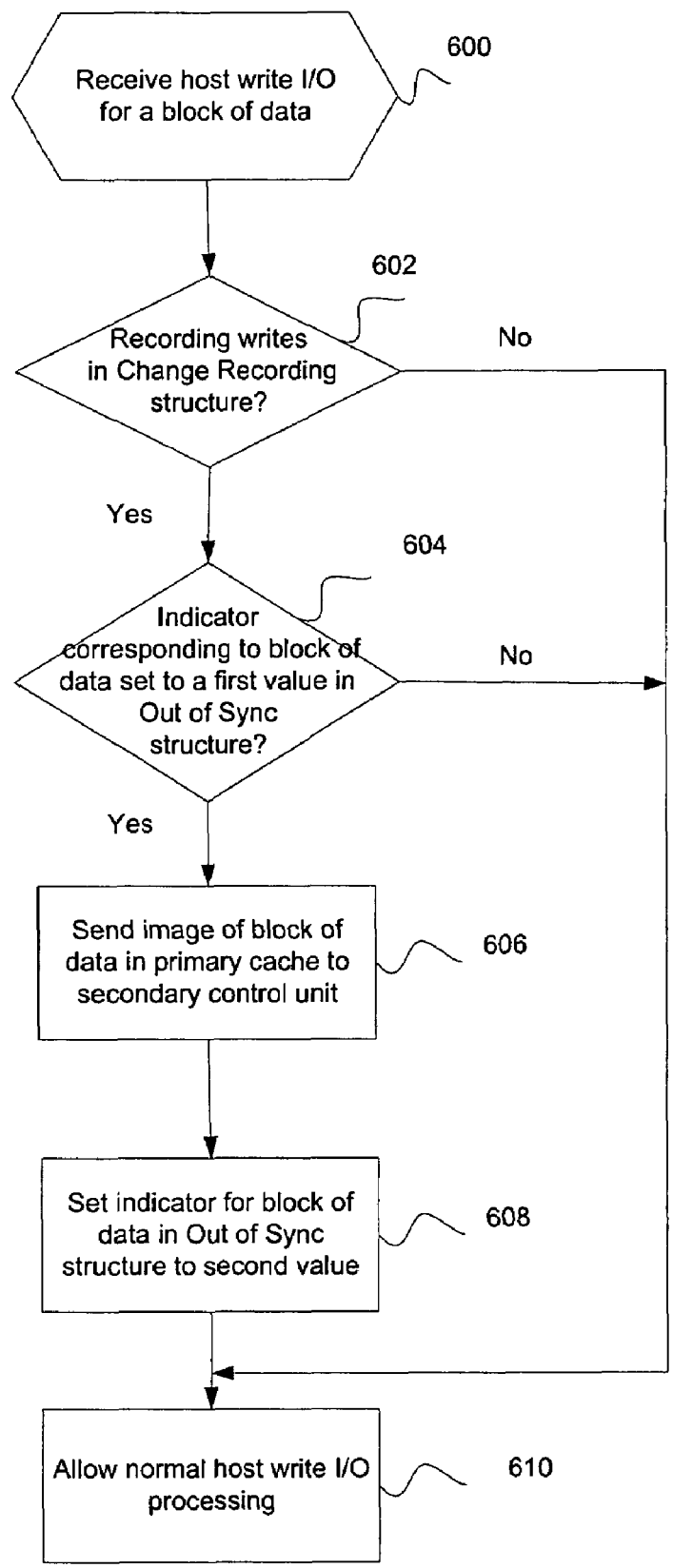
FIG. 6 illustrates logic implemented for processing host write I/O received while using a change recording structure in accordance with certain implementations of the invention.

FIG. 6 illustrates logic implemented for processing host write I/O received while using the change recording structure 220 in accordance with certain implementations of the invention. Control begins at block 600 with receipt of a host write I/O for a block of data. In block 602, it is determined whether writes are being recorded using the change recording structure 220 (i.e., the state is "consistency group in progress"). If so, processing continues to block 604, otherwise, processing continues to block 610. In block 604, it is determined whether an indicator corresponding to the block of data is set to a first value in the out of sync structure 210 to indicate that the block of data is not yet synchronized with the secondary control unit 120. If the indicator is set to the first value, processing continues to block 606, otherwise, processing continues to block 610. In block 606, an image of the block of data in primary cache 116 is sent to the secondary control unit 120. In block 608, the indicator for the block of data is set to a second value in the out of sync structure 210 to indicate that the block of data is synchronized with the secondary control unit 120. In block 610, normal host write I/O processing is allowed.

Figure 7A:
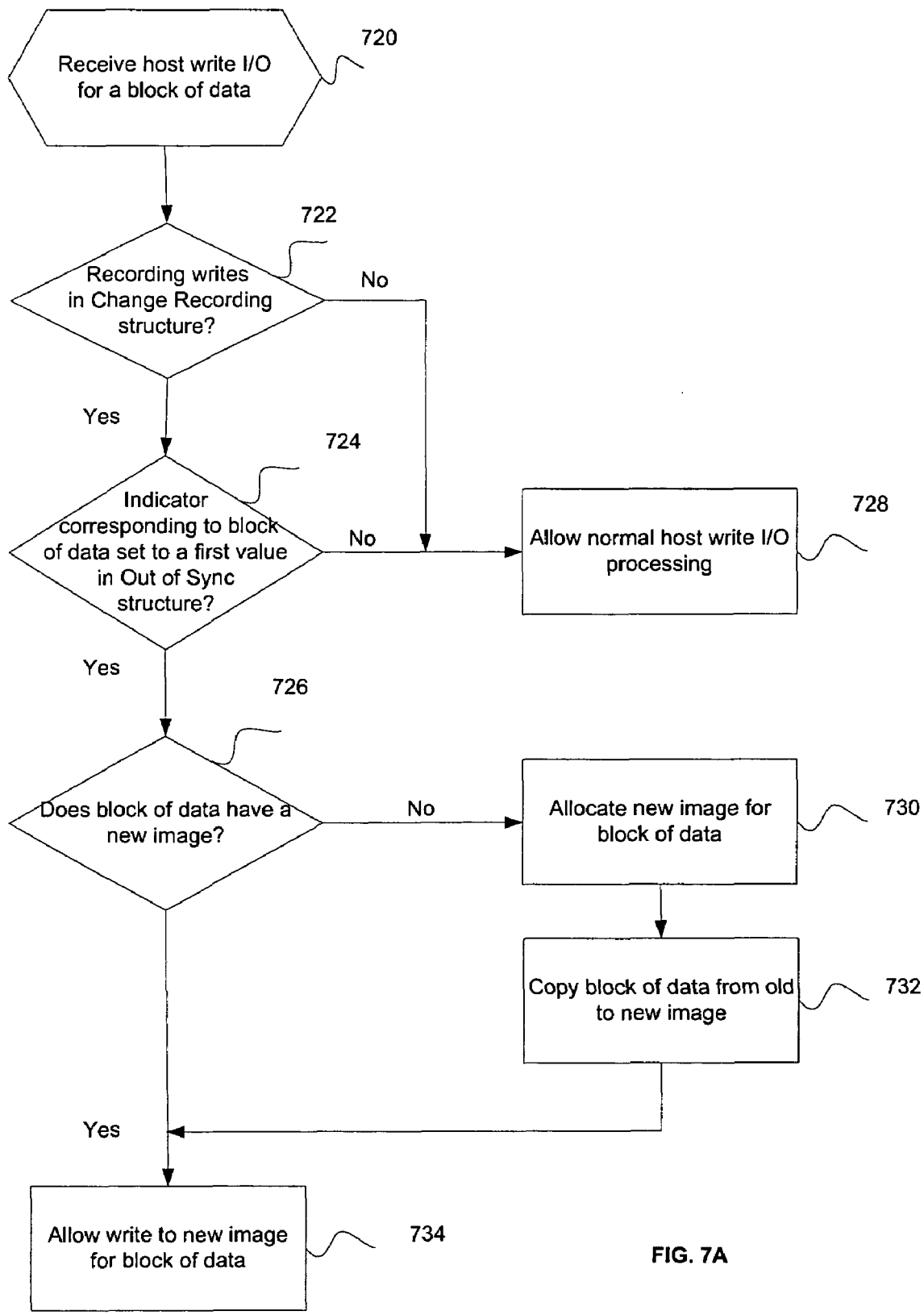
FIG. 7A illustrates logic implemented for processing host write I/O received while using a change recording structure.
Figure 7B:
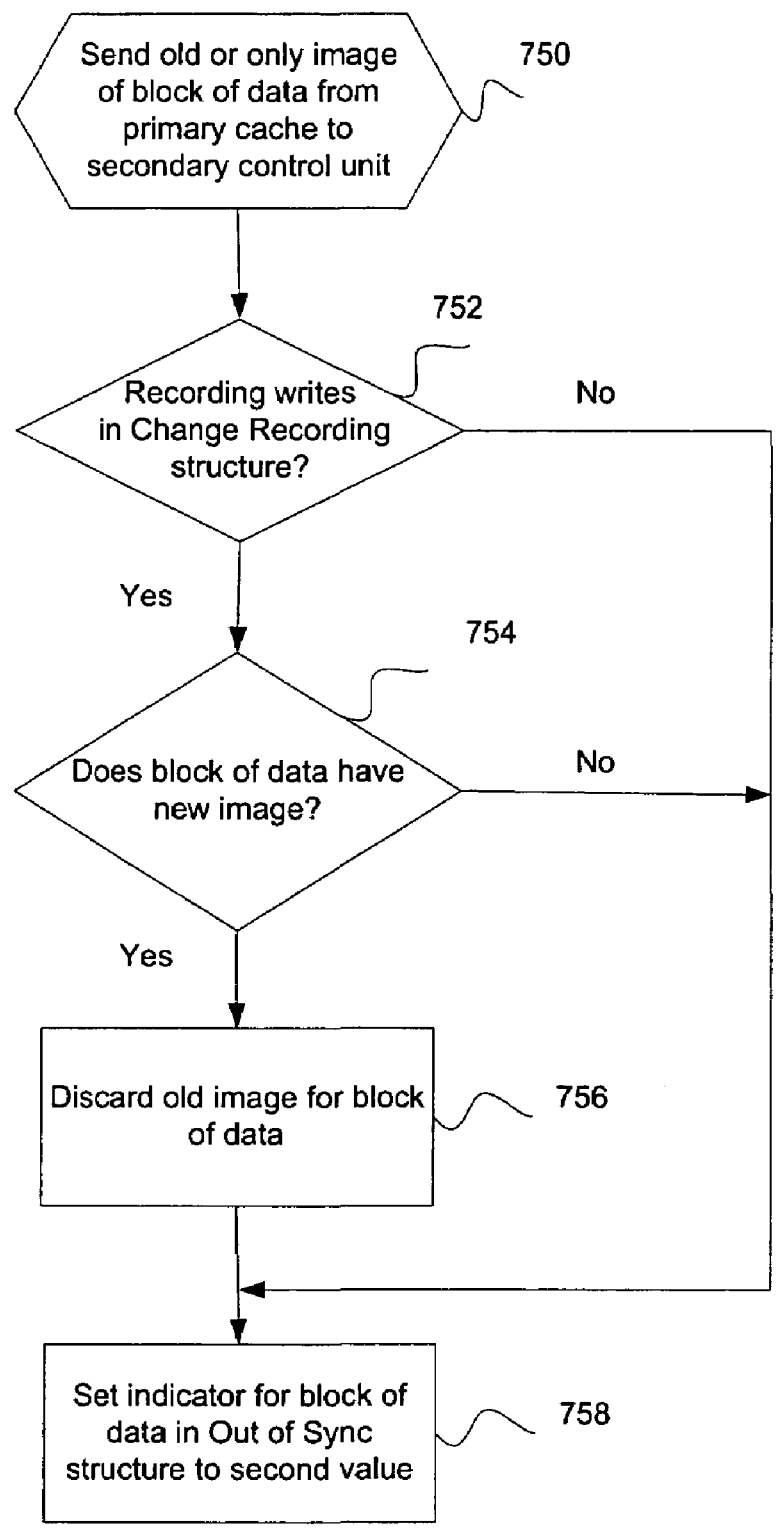
FIG. 7B illustrates logic implemented for draining an out of sync structure in accordance with certain alternative implementations of the invention.

FIG. 7A illustrates logic implemented for processing host write I/O received while using the change recording structure 220, and FIG. 7B illustrates logic implemented for draining the out of sync structure 210 in accordance with certain alternative implementations of the invention. Control begins at block 720 with receipt of a host write I/O for a block of data. In block 722, it is determined whether writes are being recorded using the change recording structure 220 (i.e., the state is "consistency group in progress"). If so, processing continues to block 724, otherwise, processing continues to block 728. In block 724, it is determined whether an indicator corresponding to the block of data is set to a first value in the out of sync structure 210 to indicate that the block of data is not yet synchronized with the secondary control unit 120. If the indicator is set to the first value, processing continues to block 726, otherwise, processing continues to block 728. In block 728, normal host write I/O processing is allowed.

In block 726, it is determined whether the block of data has a new image (i.e., whether an indicator corresponding to the block of data is set to a first value in the change recording structure 220). If so, processing continues to block 734, otherwise, processing continues to block 730. In block 730, a new image is allocated for the block of data. In block 732, the data from the old image is copied to the new image, and then processing continues to block 734. In block 734, the new image is written to the block of data. In certain alternative implementations, instead of performing the processing in block 734, after the processing of block 732, the new image is transferred to the secondary control unit 120 and writes to the old image are allowed for the block of data.

In FIG. 7B, control begins at block 750 with either the old image or the only image of a block of data being sent from primary cache 116 to the secondary control unit 120. In block 752, it is determined whether writes are being recorded using the change recording structure 220 (i.e., the state is "consistency group in progress"). If so, processing continues to block 754, otherwise, processing continues to block 758. In block 754, it is determined whether the block of data has a new image. If so, processing continues to block 756, otherwise, processing continues to block 758. In block 756, the old image for the block of data is discarded. In block 758, an indicator is set for the block of data in the out of sync structure 210 to a second value to indicate that the block of data is synchronized with the secondary control unit 120.

Figure 8A:
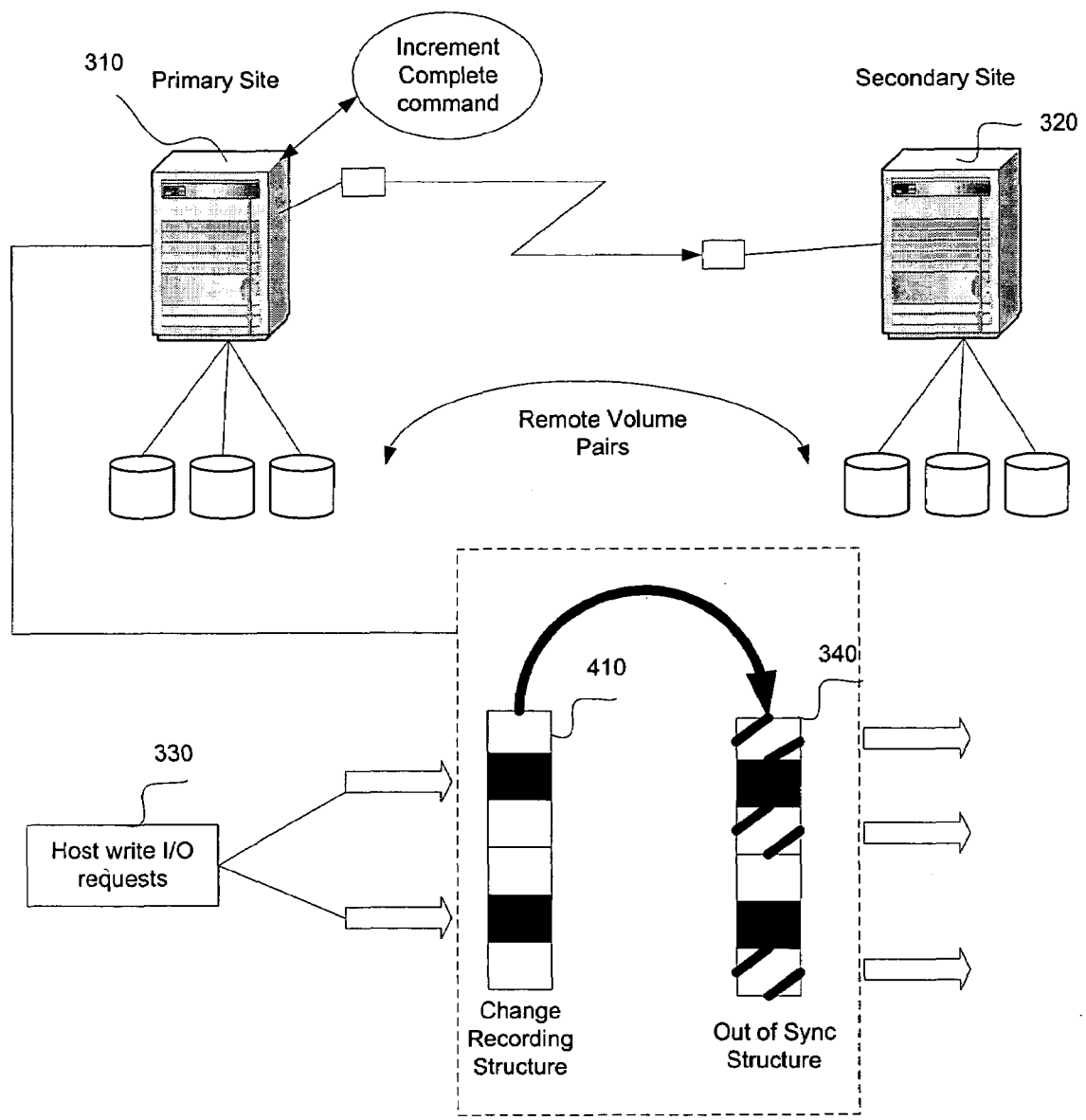
FIG. 8A illustrates a block diagram in which a state is being set to "normal" in accordance with certain implementations of the invention.
Figure 8A:
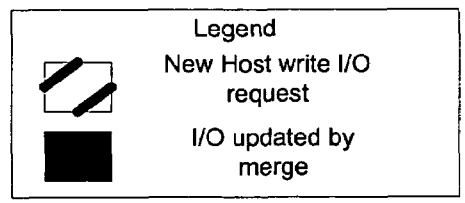
Figure 8B:
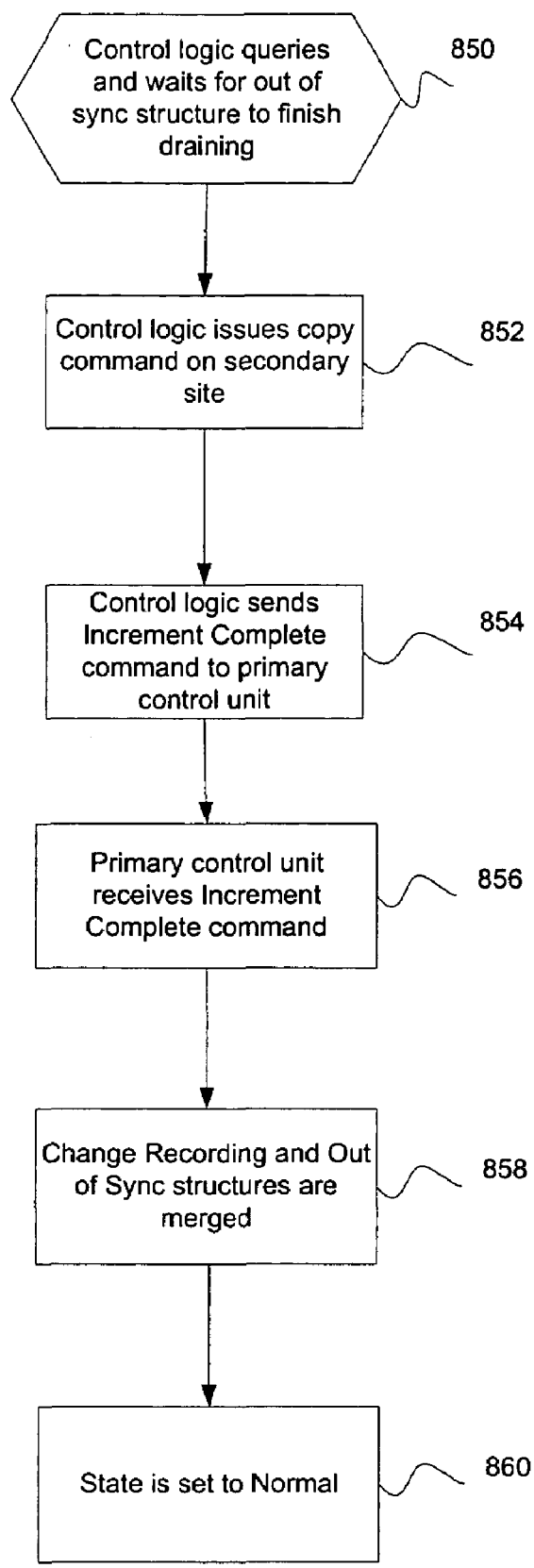
FIG. 8B illustrates logic implemented for verifying that an out of sync structure has been drained, for creating an instant virtual copy, and for processing an increment complete command in accordance with certain implementations of the invention.

FIG. 8A illustrates a block diagram in which the state 230 is being set to "normal" in accordance with certain implementations of the invention, and FIG. 8B illustrates logic implemented for verifying that an out of sync structure 340 has been drained, for creating an instant virtual copy, and for processing an increment complete command in accordance with certain implementations of the invention. In FIG. 8A, the change recording structure 410 is merged into the out of sync structure 340, and, as new host write I/O requests are received, the out of sync structure 340 is updated to identify which blocks of data have been written by the new host write I/O requests.

In FIG. 8B, control begins at block 850 with control logic querying to determine whether the out of sync structure 340 has finished draining, and if the out of sync structure 340 has not finished draining, waiting and periodically querying until the out of sync structure has finished draining. In certain alternative implementations, the control logic receives a notification that the draining is complete. In such alternative implementations, the logic for determining whether the draining is complete maintains a count of how many indicators in the out of sync structure 210 are set to, for example, a second value that indicates that the block of data has not been modified, and, when all indicators indicate the second value, a notification is sent to the control logic that draining is complete. In certain implementations, the control logic is at the primary control unit 100. In various alternative implementations, the control logic may be at the host computer 114, the secondary control unit 120, or another control system connected to the primary control unit 100 (e.g., by a network).

In block 852, the control logic issues a copy command (e.g., an instant virtual copy command, such as a Flash-copy® command) to copy data from secondary storage 122 to target storage 126. In certain implementations, an instant virtual copy command is issued with no background copy. In block 854, the control logic sends an increment complete command to the primary control unit 310. Note that the primary control unit 310 was waiting for the increment complete command in block 558. In block 856, the primary control unit 310 receives the increment complete command. In block 858, the async process 106 merges the change recording structure 410 and the out of sync structure 340. In block 860, the state 230 is set to "normal" by the async process 106.

Thus, certain implementations of the invention allow host write I/O to a primary volume to continue with minimal impact, while a consistent set of updates forms on a secondary volume. In particular, an out of sync structure is temporarily replaced with a change recording structure. That is, writes to blocks of data on the primary volume are recorded in the change recording structure, and the out of sync structure is used as the source for the consistent set of updates. By buffering writes in a change recording structure, the state of the out of sync structure is "frozen" at a consistent point in time. After all of the blocks of data identified by the out of sync structure have been copied from the primary volume to the secondary volume, a copy operation (e.g., an instant virtual copy operation, such as a FlashCopy® operation) may be performed to save the consistent point in time copy at the secondary site. A Flash-Copy® operation involves establishing a logical point-in-time relationship between source and target volumes on the same or different devices. After the FlashCopy® has been established, the indicators set in the change recording structure may be copied into the out of sync structure so that all writes that had occurred since the consistent point in time may be applied to the secondary volume.

Enterprise Storage Server, FlashCopy, and ESCON are trademarks of International Business Machines, Inc.

Additional Implementation Details

The described techniques for asynchronous copy may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain implementations, the indicators may be bits or other types of indicators. Although, in the examples above, an indicator was set to one to indicate a particular example (e.g., an indicator in an RMS modified sectors structure is set to one to indicate that a sector has been modified), the indicator may be set to another value (e.g., set to zero) to indicate the same example (e.g., an indicator in an RMS modified sectors structure is set to zero to indicate that a sector has been modified).

The logic of FIGS. 3B, 4B, 5B, 6, 7A, 7B, and 8B describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The logic of FIGS. 3B, 4B, 5B, 6, 7A, 7B, and 8B was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Figure 9:
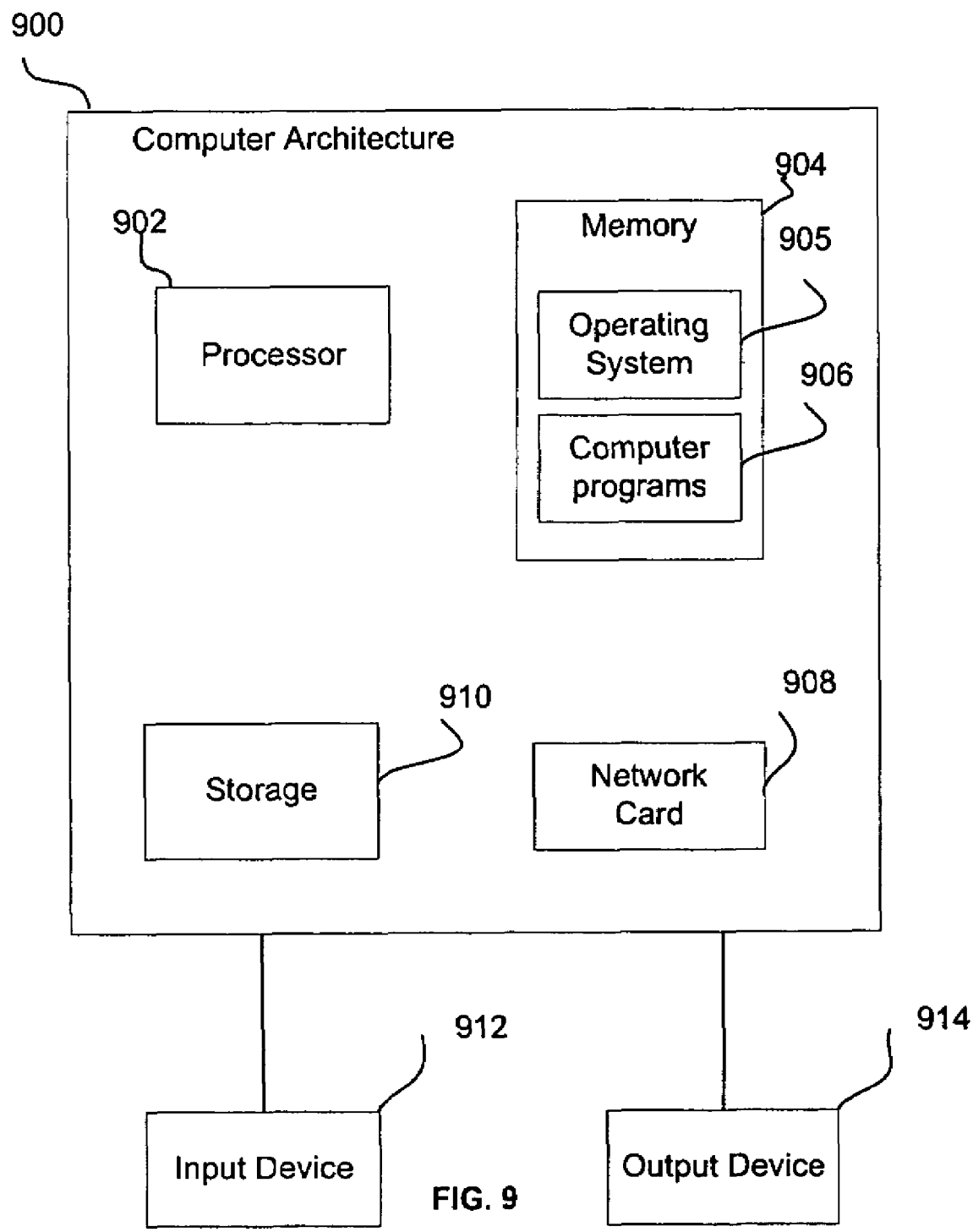
FIG. 9 illustrates one implementation of the architecture of computer systems in accordance with certain implementations of the invention.

FIG. 9 illustrates an architecture of a computer system that may be used in accordance with certain implementations of the invention. The computer architecture 900 may implement a processor 902 (e.g., a microprocessor), a memory 904 (e.g., a volatile memory device), and storage 910 (e.g., a non-volatile storage area, such as magnetic disk drives, optical disk drives, a tape drive, etc.). An operating system 905 may execute in memory 904. The storage 910 may comprise an internal storage device or an attached or network accessible storage. Computer programs 906 in storage 910 may be loaded into the memory 904 and executed by the processor 902 in a manner known in the art. The architecture further includes a network card 908 to enable communication with a network. An input device 912 is used to provide user input to the processor 902, and may include a keyboard, mouse, pen-stylus, microphone, touch sensitive display screen, or any other activation or input mechanism known in the art. An output device 914 is capable of rendering information from the processor 902, or other component, such as a display monitor, printer, storage, etc. The computer architecture 900 of the computer systems may include fewer components than illustrated, additional components not illustrated herein, or some combination of the components illustrated and additional components.

The computer architecture 900 may comprise any computing device known in the art, such as a mainframe, server, personal computer, workstation, laptop, handheld computer, telephony device, network appliance, virtualization device, storage controller, etc. Any processor 902 and operating system 905 known in the art may be used.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for maintaining consistency of data, comprising:

copying one or more blocks of data identified by a first structure at a primary site to form a consistent set of data from the primary site to a secondary site asynchronously; and while the primary site is not acknowledging completion of host write requests to any blocks of data, creating a second structure at the primary site, wherein the second structure indicates which blocks of data are modified at the primary site while the consistent set of data is being formed using the first structure.

2. The method of claim 1, further comprising:

after creating the second structure, allowing completion of write requests that had not been acknowledged; and processing new write requests, with modifications to blocks of data being recorded using the second structure.

3. The method of claim 2, wherein the second structure includes indicators, and wherein each indicator indicates whether a corresponding block of data was modified while the consistent set of data is being formed, further comprising:

receiving a new write request for a block of data; and if modifications to blocks of data are being recorded using the second structure and an indicator corresponding to the block of data is set in the first structure to indicate that the block of data is to be copied, sending an image of the block of data in cache to remote storage;

setting the corresponding indicator in the first structure to indicate that the block is not to be copied; and processing the new write request.

4. The method of claim 2, wherein the second structure includes indicators, and wherein each indicator indicates whether a corresponding block of data was modified while the consistent set of data is being formed, further comprising:
receiving a new write request for a block of data; and
if modifications to blocks of data are being recorded using the second structure, an indicator corresponding to the block of data is set in the first structure to indicate that the block of data is to be copied, and the block of data has a new image in cache, applying the new write request to the new image.

5. The method of claim 4, further comprising:
if at least one of modifications to blocks of data are not being recorded using the second structure and the indicator corresponding to the block of data is not set in the first structure to indicate that the block of data is to be copied, processing the new write request normally.

6. The method of claim 4, further comprising:
if modifications to blocks of data are being recorded using the second structure, an indicator corresponding to the block of data is set in the first structure to indicate that the block of data is to be copied, and the block of data does not have a new image in the cache,
allocating a new image for the block of data; and
applying the new write request to the new image.

7. The method of claim 4, further comprising:
sending an image of a block of data in the cache to remote storage; and
if modifications to blocks of data are being recorded using the second structure and the block of data has an image in the cache,
discarding the image in the cache; and
setting the corresponding indicator in the first structure to indicate that the block is not to be copied.

8. A method for asynchronous copy, comprising:
updating indicators in a first structure at a primary site for one or more blocks of data, wherein each indicator in the first structure indicates whether a corresponding block of data was modified at the primary site since the block of data was last sent to remote storage; and
while copying the blocks of data identified by the indicators in the first structure as having been modified since the blocks of data were last sent to remote storage, updating indicators in a second structure at the primary site for the one or more blocks of data, wherein each indicator in the second structure indicates whether a corresponding block of data was modified at the primary site while a consistent set of data is being formed using the first structure.

9. The method of claim 8, further comprising:
after copying a block of data identified by an indicator in the first structure to the remote storage, updating the indicator to indicate that the block of data is synchronized with the remote storage.

10. The method of claim 8, further comprising:
after receiving a run command,
resuming acceptance of write requests from a host;
updating indicators in the second structure instead of in the first structure; and
copying the blocks of data identified by the indicators in the first structure as having been modified since the blocks of data were last sent to remote storage.

11. An article of manufacture for maintaining consistency of data, wherein the article of manufacture causes operations, the operations comprising:
copying one or more blocks of data identified by a first structure at a primary site to form a consistent set of data from the primary site to a secondary site asynchronously; and
while the primary site is not acknowledging completion of host write requests to any blocks of data, creating a second structure at the primary site, wherein the second structure indicates which blocks of data are modified at the primary site while the consistent set of data is being formed using the first structure.

12. The article of manufacture of claim 11, wherein the operations further comprise:
after creating the second structure,
allowing completion of write requests that had not been acknowledged; and
processing new write requests, with modifications to blocks of data being recorded using the second structure.

13. The article of manufacture of claim 12, wherein the second structure includes indicators, wherein each indicator indicates whether a corresponding block of data was modified while the consistent set of data is being formed, and wherein the operations further comprise:
receiving a new write request for a block of data; and
if modifications to blocks of data are being recorded using the second structure and an indicator corresponding to the block of data is set in the first structure to indicate that the block of data is to be copied,
sending an image of the block of data in cache to remote storage;
setting the corresponding indicator in the first structure to indicate that the block is not to be copied; and
processing the new write request.

14. The article of manufacture of claim 12, wherein the second structure includes indicators, wherein each indicator indicates whether a corresponding block of data was modified while the consistent set of data is being formed, and wherein the operations further comprise:
receiving a new write request for a block of data; and
if modifications to blocks of data are being recorded using the second structure, an indicator corresponding to the block of data is set in the first structure to indicate that the block of data is to be copied, and the block of data has a new image in cache, applying the new write request to the new image.

15. The article of manufacture of claim 14, wherein the operations further comprise:
if at least one of modifications to blocks of data are not being recorded using the second structure and the indicator corresponding to the block of data is not set in the first structure to indicate that the block of data is to be copied, processing the new write request normally.

16. The article of manufacture of claim 14, wherein the operations further comprise:
if modifications to blocks of data are being recorded using the second structure, an indicator corresponding to the block of data is set in the first structure to indicate that the block of data is to be copied, and the block of data does not have a new image in the cache,
allocating a new image for the block of data; and
applying the new write request to the new image.

17. The article of manufacture of claim 14, wherein the operations further comprise:
sending an image of a block of data in the cache to remote storage; and if modifications to blocks of data are being recorded using the second structure and the block of data has an image in the cache, discarding the image in the cache; and setting the corresponding indicator in the first structure to indicate that the block is not to be copied.

18. An article of manufacture for asynchronous copy, wherein the article of manufacture causes operations, the operations comprising:

updating indicators in a first structure at a primary site for one or more blocks of data, wherein each indicator in the first structure indicates whether a corresponding block of data was modified at the primary site since the block of data was last sent to remote storage; and while copying the blocks of data identified by the indicators in the first structure as having been modified since the blocks of data were last sent to remote storage, updating indicators in a second structure at the primary site for the one or more blocks of data, wherein each indicator in the second structure indicates whether a corresponding block of data was modified at the primary site while a consistent set of data is being formed using the first structure.

19. The article of manufacture of claim 18, wherein the operations further comprise:

after copying a block of data identified by an indicator in the first structure to the remote storage, updating the indicator to indicate that the block of data is synchronized with the remote storage.

20. The article of manufacture of claim 18, wherein the operations further comprise:

after receiving a run command, resuming acceptance of write requests from a host;

updating indicators in the second structure instead of in the first structure; and copying the blocks of data identified by the indicators in the first structure as having been modified since the blocks of data were last sent to remote storage.

21. A system for maintaining consistency of data, comprising:

means for copying one or more blocks of data identified by a first structure at a primary site to form a consistent set of data from the primary site to a secondary site asynchronously; and means for, while the primary site is not acknowledging completion of host write requests to any blocks of data, creating a second structure at the primary site, wherein the second structure indicates which blocks of data are modified at the primary site while the consistent set of data is being formed using the first structure.

22. The system of claim 21, further comprising:

after creating the second structure, means for allowing completion of write requests that had not been acknowledged; and means for processing new write requests, with modifications to blocks of data being recorded using the second structure.

23. The system of claim 22, wherein the second structure includes indicators, and wherein each indicator indicates whether a corresponding block of data was modified while the consistent set of data is being formed, farther comprising:

means for receiving a new write request for a block of data; and if modifications to blocks of data are being recorded using the second structure and an indicator corresponding to the block of data is set in the first structure to indicate that the block of data is to be copied, means for sending an image of the block of data in cache to remote storage;

means for setting the corresponding indicator in the first structure to indicate that the block is not to be copied; and means for processing the new write request.

24. The system of claim 22, wherein the second structure includes indicators, and wherein each indicator indicates whether a corresponding block of data was modified while the consistent set of data is being formed, farther comprising:

means for receiving a new write request for a block of data; and means for, if modifications to blocks of data are being recorded using the second structure, an indicator corresponding to the block of data is set in the first structure to indicate that the block of data is to be copied, and the block of data has a new image in cache, applying the new write request to the new image.

25. The system of claim 24, farther comprising:

means for, if at least one of modifications to blocks of data are not being recorded using the second structure and the indicator corresponding to the block of data is not set in the first structure to indicate that the block of data is to be copied, processing the new write request normally.

26. The system of claim 24, further comprising:

if modifications to blocks of data are being recorded using the second structure, an indicator corresponding to the block of data is set in the first structure to indicate that the block of data is to be copied, and the block of data does not have a new image in the cache, means for allocating a new image for the block of data; and means for applying the new write request to the new image.

27. The system of claim 24, further comprising:

means for sending an image of a block of data in the cache to remote storage; and if modifications to blocks of data are being recorded using the second structure and the block of data has an image in the cache, means for discarding the image in the cache; and means for setting the corresponding indicator in the first structure to indicate that the block is not to be copied.

28. A system for asynchronous copy, comprising:

means for updating indicators in a first structure at a primary site for one or more blocks of data, wherein each indicator in the first structure indicates whether a corresponding block of data was modified at the primary site since the block of data was last sent to remote storage; and means for, while copying the blocks of data identified by the indicators in the first structure as having been modified since the blocks of data were last sent to remote storage, updating indicators in a second structure at the primary site for the one or more blocks of data, wherein each indicator in the second structure indicates whether a corresponding block of data was modified at the primary site while a consistent set of data is being formed using the first structure.

29. The system of claim 28, further comprising:
means for, after copying a block of data identified by an indicator in the first structure to the remote storage, updating the indicator to indicate that the block of data is synchronized with the remote storage.

30. The system of claim 28, further comprising:
after receiving a run command,
  means for resuming acceptance of write requests from a host;
  means for updating indicators in the second structure instead of in the first structure; and
  means for copying the blocks of data identified by the indicators in the first structure as having been modified since the blocks of data were last sent to remote storage.

* * * * *